Patented Oct. 31, 1939

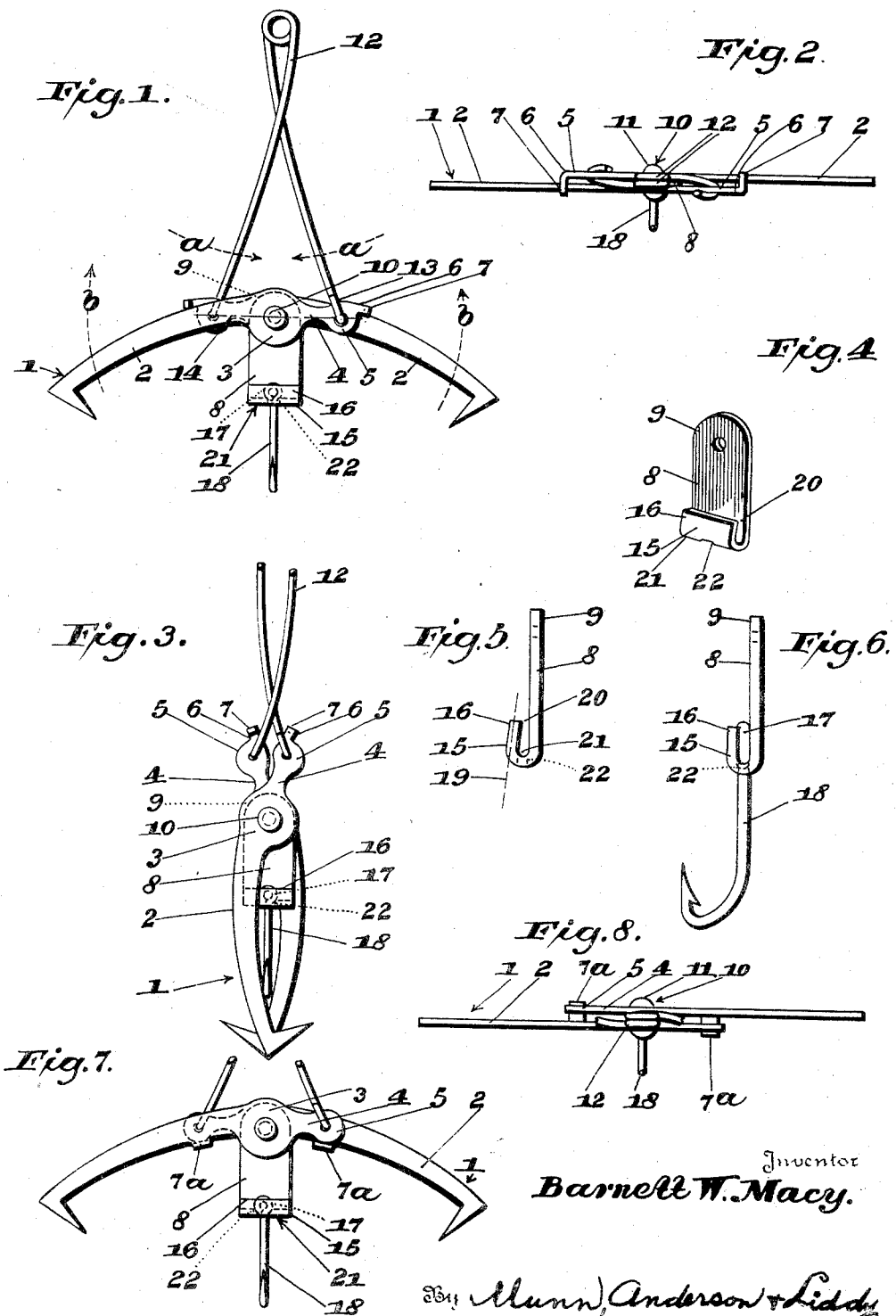

2,177,902

UNITED STATES PATENT OFFICE 2,177,902

TRAP FISHHOOK

Barnett W. Macy, Jacksonville, Fla.

Application February 16, 1938, Serial No. 190,843

3 Claims. (Cl. 43—89)

This invention relates to improvements in trap fishhooks, the objects thereof being as follows:

First, to provide a trap fishhook which is so constructed that it will remain in its set position during any condition of handling, as diving or casting, but which will snap immediately upon an appropriate pull on the bait hook.

Second, to provide a trap fishhook wherein the foregoing function is attained by setting the two spring anchorages and the common gaff hook and trigger plate pivot on a dead center prior to casting, said dead center position holding the gaffs open during all ordinary handling but upsetting immediately upon the pulling the common pivot the least distance out of line.

Third, to provide a hook of the foregoing kind wherein stops are provided to prevent the gaff hooks from springing upward as they should not, instead of downward as they should.

Fourth, to provide an improved trigger plate which enables the easy insertion and removal of various types of bait hooks yet serves to hold these various types with equal firmness.

Other objects and advantages will appear in the following specification, reference being had to the accompanying drawing in which:

Figure 1 is a side elevation of the improved trap fishhook showing it in the set position.

Figure 2 is a plan view of the fishhook.

Figure 3 is a side elevation of the fishhook in the sprung position.

Figure 4 is a perspective view of the improved trigger plate.

Figure 5 is a side elevation of the trigger plate illustrating the tension lip in its initial position.

Figure 6 is a side elevation of the trigger plate showing the bait hook in place.

Figure 7 is a side elevation of the trap-hook illustrating a slight modification.

Figure 8 is a plan view of the fishhook in Fig. 7.

The trap fishhook, generally designated 1 in both forms of the invention, comprises a pair of gaff hooks 2, each of which is enlarged at 3 and provided with an arm 4 which terminates in an eye 5. Each eye has an extension 6 which is bent at a substantially right angle at 7 (Fig. 2) to provide a stop.

A trigger plate 8 is situated between the two gaff hooks 2. This trigger plate is preferably mounded at one end as at 9. A pivot 10 commonly connects the two gaff hooks 2 and the trigger plate 8. The rounded end 9 occupies a position between the enlargements 3, and since the ends 11 of the pivot are upset in such a manner as not to bind upon the enlargements 3, it follows that the gaff hooks can be opened and closed with perfect freedom and that the trigger plate 8 can swing laterally quite freely as much as may be required.

In practice it is intended to make all parts of the trap fishhook of stainless steel, so that it can be cast in salt water without danger of rusting. This provision is also extended to the spring 12, the extremities 13 of which are anchored in the eyes 5. The tension of the spring is to close inwards (arrows a).

Considering the direction of the tension it is easy to see that it could be possible for the gaff hooks 2 to close upwards (arrows b) as well as downwards, were it not for the stops which the bent ends 7 afford.

It is important to note that when the stops 7 function by being engaged with the backs of the gaff hooks 2 (Fig. 1) the two spring anchorages 13 and the gaff hook and trigger plate pivot 10 are on a common line 14, in other words on dead center. Since the spring tension is inward (arrows a) it has been found that the hook will remain in the set position shown (Fig 1) during all ordinary handling, for example, such as preparing to make and actually performing the cast. But the hook will be sprung (Fig. 3) upon an appropriate downward pull upon the trigger plate 8 and in order to understand the construction of the latter attention is directed to Figs. 4, 5 and 6.

The end 15 opposite to the rounded end 9, is bent upon itself to provide a tension lip 16. The material of the plate 8 is desirably of a spring metal, although this is not always essential, so that when using the tension lip the latter will exercise a degree of pressure against the eye 17 of the bait hook 18.

In order to insure this pressure the tension lip 16 is bent slightly inward as denoted by the line 19 (Fig. 5). The result is that the entrance space 20 is slightly narrower than the pocket 21. The latter has a slot 22 (Fig. 4).

But, inasmuch as the elongation lies in the longitudinal direction of the pocket 21 it follows that a part of the curvature of the eye 17 can rest therein. This position in conjunction with the inward pressure of the tension lip 16, against the top of the eye, holds the bait hook firmly so that it can neither rock nor slip out. The insertion of the bait hook is made by putting the barb through first. This is directed into the pocket 21, and through the slot 22, and as the shank of the hook follows, the tension lip 16, is separated so that the eye 17 can be snapped into place.

The only distinction in Figs. 7 and 8 from the construction in Figs. 1 and 2 lies in the position of the stops 7a. Since all other parts are the same as already described, they are designated with corresponding numerals without further description. The stops 7a are now formed on the gaff hooks 2 themselves, being bent in such directions as to engage the eyes 5 of the arms 4 substantially as shown. It is conceivable that several other styles of stops could be embodied but in every instance the stops are intended to prevent the gaff hooks from moving upwards beyond the dead center by action of the spring 12.

I claim:

1. A trap-hook comprising a pair of gaff hooks, a trigger plate, a tension spring having a pair of ends each end being anchored to its respective gaff hook, a pivot commonly connecting the gaff hooks and trigger plate, and means for limiting the set position of the gaff hooks to a dead center of said common pivot and the spring anchorages.

2. A trap-hook comprising a pair of gaff hooks, each having an arm with an eye, a trigger plate, a pivot commonly connecting the gaff hooks and trigger plate, a spring having a pair of ends each end being anchored to its respective eye, and stop means incorporated in each gaff hook to limit its set position to a dead centering of the common pivot and spring anchorages.

3. A trap-hook comprising a pair of gaff hooks, each gaff hook having an arm with an eye, an extension on each eye common to the plane of the respective gaff hook and situated tangentially of the eye, stop means on each extension and engageable with the back of the adjacent gaff hook, a trigger plate, a pivot commonly connecting the gaff hooks and trigger plate, and a spring having a pair of ends, each end being anchored to its respective eye to exercise a closing tension upon the gaff hooks, the engagement of the stop means with the backs of the gaff hooks producing a dead centering of the spring anchorages in the set position of the gaff hooks, thereby insuring a release of the gaff hooks upon a pull on the trigger plate sufficient to displace the pivot below the dead center.

BARNETT W. MACY.